(12) United States Patent
Bryson et al.

(10) Patent No.: US 11,630,424 B2
(45) Date of Patent: Apr. 18, 2023

(54) TIME SIGNAL MANIPULATION DETECTION USING REMOTELY MANAGED TIME

(71) Applicant: Schweitzer Engineering Laboratories, Inc., Pullman, WA (US)

(72) Inventors: Michael B Bryson, Pullman, WA (US); Dennis Haes, Colfax, WA (US)

(73) Assignee: Schweitzer Engineering Laboratories, Inc., Pullman, WA (US)

(*) Notice: Subject to any disclaimer, the term of this patent is extended or adjusted under 35 U.S.C. 154(b) by 949 days.

(21) Appl. No.: 16/510,222

(22) Filed: Jul. 12, 2019

(65) Prior Publication Data

US 2020/0018861 A1   Jan. 16, 2020

Related U.S. Application Data

(60) Provisional application No. 62/697,909, filed on Jul. 13, 2018.

(51) Int. Cl.
*G04R 20/00* (2013.01)
*G04G 7/00* (2006.01)
*H02J 1/00* (2006.01)

(52) U.S. Cl.
CPC ............ *G04R 20/00* (2013.01); *G04G 7/023* (2013.01); *H02J 1/00* (2013.01)

(58) Field of Classification Search
CPC . G04R 20/00; F42B 12/36; H02J 1/00; G04G 7/023
USPC ......................................................... 700/286
See application file for complete search history.

(56) References Cited

U.S. PATENT DOCUMENTS

| 5,160,926 | A | 11/1992 | Schweitzer, III |
| 5,557,284 | A | 9/1996 | Hailman |
| 5,737,715 | A | 4/1998 | Deaton |
| 6,144,334 | A | 11/2000 | Claffey |

(Continued)

FOREIGN PATENT DOCUMENTS

| WO | 9747987 | 12/1997 |
| WO | 2012151006 | 11/2012 |
| WO | 2014005016 | 1/2014 |

OTHER PUBLICATIONS

Tippenhauer, N.O., Popper, C., Rasmussen, K.B., Capkun, S., On the Requirements for Successful GPS Spoofing Attacks, In Proceedings of the ACM Conference on Computer and Communications Security (CCS), Oct. 2011.

(Continued)

*Primary Examiner* — Yemane Mehari
(74) *Attorney, Agent, or Firm* — Fletcher Yoder, P.C.; Richard M. Edge

(57) ABSTRACT

Systems and methods are provided for monitoring or protecting an electric power distribution system using protective devices that may rely on accurate time signals from a common time source. A first protective device may receive a first time signal deriving from the common time source and a second protective device may receive a second time signal deriving from the common time source. The first time signal and the second time signal may be compared; when a difference between them exceeds a defined threshold, time signal manipulation may be detected. The protective devices may modify their operation in response to or to account for the time signal manipulation.

18 Claims, 6 Drawing Sheets

(56) References Cited

U.S. PATENT DOCUMENTS

| | | |
|---|---|---|
| 6,229,479 B1 | 5/2001 | Kozlov |
| 6,483,856 B1 | 11/2002 | Bird |
| 7,146,516 B2 | 12/2006 | Dhupar |
| 7,375,683 B2 | 5/2008 | Smith |
| 7,398,411 B2 | 7/2008 | Zweigle |
| 7,436,232 B2 | 10/2008 | Sivero |
| 7,440,427 B1 | 10/2008 | Katz |
| 7,606,541 B1 | 10/2009 | Nicholls |
| 7,940,213 B2 | 5/2011 | Harper |
| 7,952,519 B1 | 5/2011 | Nielsen |
| 7,978,130 B1 | 7/2011 | Cohen |
| 7,979,228 B2 | 7/2011 | Zurbuchen |
| 8,055,288 B2 | 11/2011 | Ladd |
| 8,138,972 B2 | 3/2012 | Underbrink |
| 8,159,391 B2 | 4/2012 | Papadimitratos |
| 8,237,609 B2 | 8/2012 | Talbot |
| 8,325,087 B2 | 12/2012 | Thomson |
| 8,326,319 B2 | 12/2012 | Davis |
| 8,446,896 B2 | 5/2013 | Bedrosian |
| 8,564,330 B1 | 10/2013 | Radulov |
| 8,655,608 B2 | 2/2014 | Guzman-Casillas |
| 8,812,256 B2 | 8/2014 | Lee |
| 8,867,520 B2 | 10/2014 | Nicholls |
| 9,083,503 B2 | 7/2015 | Sagen |
| 9,270,442 B2 | 2/2016 | Rice |
| 9,300,591 B2 | 3/2016 | Rajasekaran |
| 9,319,100 B2 | 4/2016 | Achanta |
| 9,400,330 B2 | 7/2016 | Achanta |
| 9,520,860 B2 | 12/2016 | Whitehead |
| 9,599,719 B2 | 3/2017 | Achanta |
| 9,709,680 B2 | 7/2017 | Achanta |
| 9,709,682 B2 | 7/2017 | Achanta |
| 9,759,816 B2 | 9/2017 | Achanta |
| 9,813,173 B2 | 11/2017 | Achanta |
| 10,375,108 B2 | 8/2019 | Schweitzer |
| 2002/0033767 A1 | 3/2002 | Krasner |
| 2002/0136172 A1 | 9/2002 | Chun |
| 2002/0158693 A1 | 10/2002 | Soong |
| 2002/0167934 A1 | 11/2002 | Carter |
| 2003/0004689 A1 | 1/2003 | Gupta |
| 2003/0087654 A1 | 5/2003 | Wheeler |
| 2003/0107513 A1 | 6/2003 | Abraham |
| 2004/0062279 A1 | 4/2004 | Primrose |
| 2004/0166879 A1 | 8/2004 | Meadows |
| 2004/0228368 A1 | 11/2004 | Jecmen |
| 2005/0114023 A1 | 5/2005 | Williamson |
| 2006/0259806 A1 | 11/2006 | Zweigle |
| 2007/0132773 A1 | 6/2007 | Plante |
| 2007/0194987 A1 | 8/2007 | Fedora |
| 2008/0062039 A1 | 3/2008 | Cohen |
| 2008/0071482 A1 | 3/2008 | Zweigle |
| 2008/0169978 A1 | 7/2008 | Powell |
| 2008/0186229 A1 | 8/2008 | Van Diggelen |
| 2008/0198069 A1 | 8/2008 | Gronemeyer |
| 2009/0117928 A1 | 5/2009 | Ladd |
| 2009/0160705 A1 | 6/2009 | Matsuzaki |
| 2009/0262016 A1 | 10/2009 | Wirola |
| 2009/0315764 A1 | 12/2009 | Cohen |
| 2010/0030916 A1 | 2/2010 | Greenwood Graham |
| 2010/0034190 A1 | 2/2010 | Yun |
| 2010/0073228 A1 | 3/2010 | Smith |
| 2010/0117899 A1 | 5/2010 | Papadimitratos |
| 2010/0127928 A1 | 5/2010 | Thomson |
| 2010/0190509 A1 | 7/2010 | Davis |
| 2010/0222068 A1 | 9/2010 | Gaal |
| 2010/0231445 A1 | 9/2010 | Tarlow |
| 2010/0231448 A1 | 9/2010 | Harper |
| 2010/0253578 A1 | 10/2010 | Mantovani |
| 2010/0254225 A1 | 10/2010 | Schweitzer, III |
| 2011/0001668 A1 | 1/2011 | Cobb |
| 2011/0035066 A1 | 2/2011 | Schweitzer |
| 2011/0063767 A1 | 3/2011 | Kasztenny |
| 2011/0068973 A1 | 3/2011 | Humphreys |
| 2011/0085540 A1 | 4/2011 | Kuwabara |
| 2011/0102258 A1 | 5/2011 | Underbrink |
| 2011/0102259 A1 | 5/2011 | Ledvina |
| 2011/0169577 A1 | 7/2011 | Nicholls |
| 2011/0181466 A1 | 7/2011 | Serrano |
| 2011/0227787 A1 | 9/2011 | Gum |
| 2011/0261917 A1 | 10/2011 | Bedrosian |
| 2011/0285586 A1 | 11/2011 | Ferguson |
| 2011/0287779 A1 | 11/2011 | Harper |
| 2012/0005326 A1 | 1/2012 | Bradetich |
| 2012/0026037 A1 | 2/2012 | Thomson |
| 2012/0030495 A1 | 2/2012 | Chandhoke |
| 2012/0066418 A1 | 3/2012 | Foster |
| 2012/0116677 A1 | 5/2012 | Higgison |
| 2012/0179404 A1 | 7/2012 | Lee |
| 2012/0182181 A1 | 7/2012 | Dai |
| 2012/0195253 A1 | 8/2012 | Irvine |
| 2012/0195350 A1 | 8/2012 | Das |
| 2012/0323397 A1 | 12/2012 | Schweitzer, III |
| 2013/0157593 A1 | 6/2013 | Achanta |
| 2013/0244624 A1 | 9/2013 | Das |
| 2013/0328606 A1 | 12/2013 | Ravi |
| 2013/0335266 A1 | 12/2013 | Vollath |
| 2014/0003199 A1 | 1/2014 | Dougan |
| 2014/0094218 A1 | 4/2014 | Hammes |
| 2014/0100702 A1 | 4/2014 | Schweitzer |
| 2014/0114608 A1 | 4/2014 | Achanta |
| 2014/0232595 A1 | 8/2014 | Rife |
| 2014/0250972 A1* | 9/2014 | Achanta ............... G01S 19/215 73/1.43 |
| 2014/0327574 A1 | 11/2014 | Achanta |
| 2014/0334477 A1* | 11/2014 | Stahlin ............. H04L 12/40039 370/347 |
| 2015/0043697 A1 | 2/2015 | Achanta |
| 2015/0081235 A1 | 3/2015 | Schweitzer |
| 2015/0081887 A1 | 3/2015 | Kalkunte |
| 2015/0312023 A1 | 10/2015 | Rice |
| 2015/0331052 A1 | 11/2015 | Seeley |
| 2015/0364953 A1 | 12/2015 | Rippon |
| 2017/0195362 A1* | 7/2017 | Schweitzer, III ... G06F 11/0793 |

OTHER PUBLICATIONS

Moore, P., Crossley, P., GPS Applications in Power Systems Part 1 Introduction to GPS, Tutorial: GPS in Power Systems, Power Engineering Journal, Feb. 1999.

Jafarnia-Jahromi, A., Broumandan, A., Nielsen, J., Lachapelle, G., "GPS Vulnerability to Spoofing Threats and a Review of Antispoofing Techniques", International Journal of Navigation and Observation vol. 2012, Article ID 127072, Feb. 2012.

Wullems, C., "A Spoofing Detection Method for Civilian L1 GPS and the E1-B Galileo Safety of Life Service". IEEE Transactions on Aerospace and Electronic Systems, Aug. 2011.

Wen, H., Huang, P. Y., Dyer, J., Archinal, A., Fagan, J., "Countermeasures for GPS Signal Spoofing," Proceedings of the 18th International Technical Meeting of the Satellite Division of The Institute of Navigation (ION GNSS 2005), Long Beach, CA, Sep. 2005, pp. 1285-1290.

Gurtner, W., Estey, L., "Rinex: The Receiver Independent Exchange Format Version 3.00", Nov. 28, 2007.

Gurtner, W., "Rinex: The Receiver Independent Exchange Format Version 2", Sep. 2008.

Shepard, D., Humphreys, T., Fansler, A., "Evaluation of the Vulnerability of Phasor Measurement Units to GPS Spoofing Attacks", Oct. 2, 2011.

Zhou et al., Adaptive Correction Method for an OCXO and Investigation of Analytic Cumulative Time Error Upper Bound, Jan. 2011, IEEE Transactions on Ultrasonics, Ferroelectrics, and Frequency Control, vol. 58, No. 1, pp. 43-50.

* cited by examiner

TIME SIGNAL MANIPULATION DETECTION USING REMOTELY MANAGED TIME

CROSS-REFERENCE TO RELATED APPLICATIONS

This application claims the benefit of Provisional Application Ser. No. 62/697,909, filed on Jul. 13, 2018 and entitled "Time Signal Manipulation Detection by System of Electric Power System Protection Devices," which is incorporated by reference in its entirety.

BACKGROUND

This disclosure relates to monitoring a power transmission system using remotely managed common time signals. More particularly, this disclosure relates to determining whether clock spoofing or other clock failure has changed or replaced a remotely managed common time signal.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

Electric power delivery systems are widely used to generate and distribute electric power to loads. While some systems (or portions of systems) operate in direct current (DC), many electric power delivery systems operate (or have portions that operate) in alternating current (AC). In AC systems, the power flowing through the conductors and other power system equipment is from current waveforms and voltage waveforms alternating between high and low peaks in a generally sinusoidal fashion (e.g., sinusoidal voltage or current signals). The frequency of the alternating waveforms are a key power system measurement for frequency control and frequency protection. A common time signal may be used to determine the frequency or may otherwise be referenced in control operations. In this way, the common time signal may be used as a basis for many monitoring and protection functions, such as frequency measurement operations, load shedding operations, overexcitation protection operations, synchrophasor measurement operations, switching operations, bus transfer operations, and so on. However, recent developments in power transmission systems have led to the possibility of attacks on a power transmission system via a manipulated time signal. Without an accurate common time signal, it may be difficult to monitor and/or protect the electric power delivery system.

DETAILED DESCRIPTION

Figure 1:
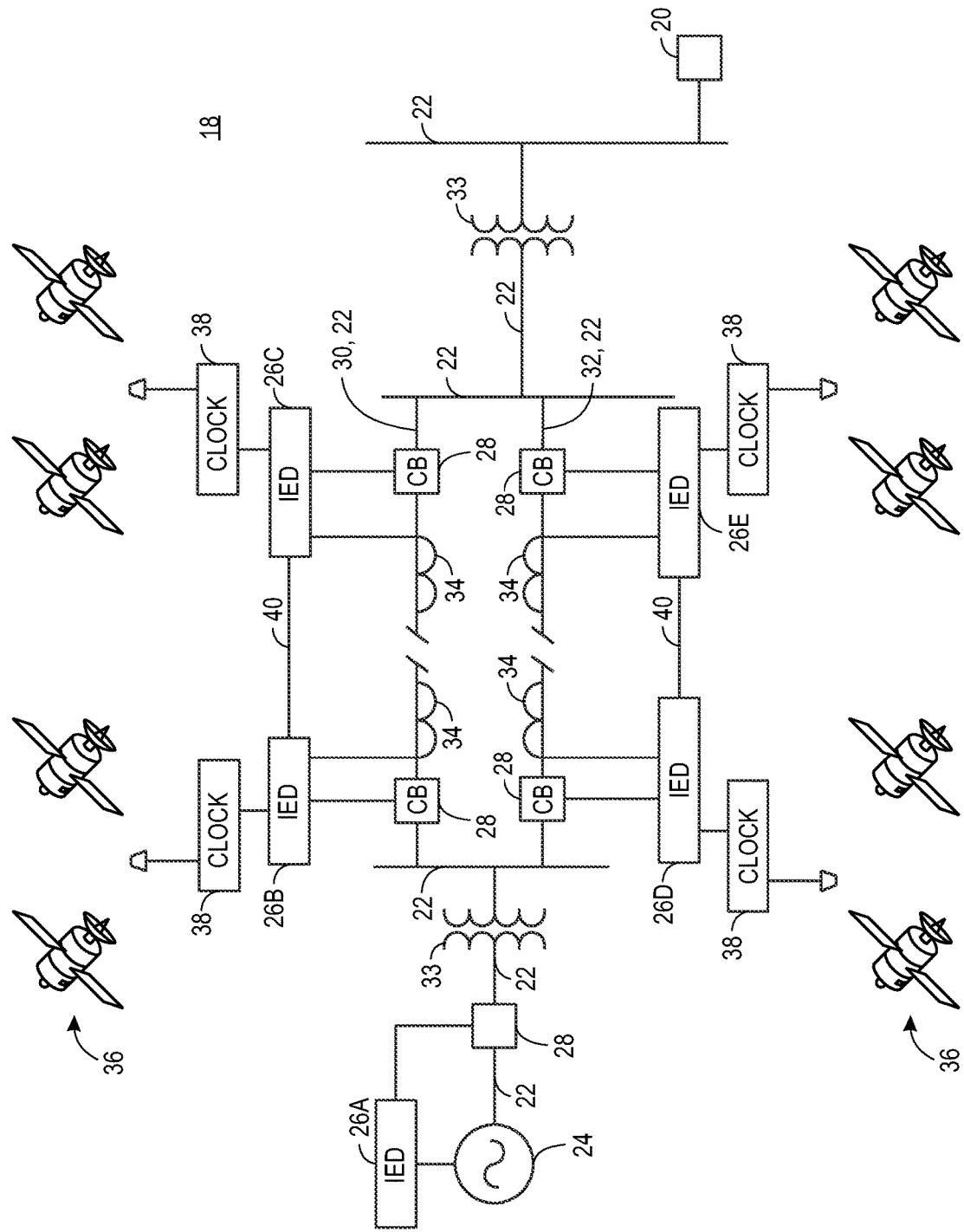
FIG. 1 is a block diagram of an example electric power delivery (e.g., transmission) system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

Electric power delivery systems may generate and distribute electric power to loads. In some electric power delivery systems, at least a portion of the electric power delivery system operates in direct current (DC). However, many electric power delivery systems operate at least partially in alternating current (AC). In AC systems, operations of the electric power delivery system are sometimes based on a frequency of the waveforms generated and/or distributed via the electric power delivery system, where the frequency may be determined using one or more time signals (e.g., clock signals, timing signals, indication of a time). These operations may include, for example, frequency control operations, frequency protection operations, load shedding operations, overexcitation protection operations, synchrophasor measurement operations, switching operations, bus transfer operations, or the like. Accordingly, an accurate time signal may be useful for proper monitoring and protection of the power system by intelligent electronic devices (IEDs).

One example IED is a relay. A relay may base one or more of its operations on a common time signal. For example, the relay may use an electric power delivery system frequency when determining when to close a circuit breaker, such as during synchronization operations. Synchronization operations may be performed when a relay coupled between two or more buses is determining to close a circuit breaker. Each of the two or more buses may transport electrical power waveforms. Thus, the synchronization operations may include determining when the different electrical waveforms are similar enough to enable uninterrupted (e.g., desirable) sharing of electrical power waveforms between the buses once the relay closes the circuit breaker. An inaccurate common time signal may interfere with the synchronization operations and/or reduce an accuracy of frequency determination operations, such as by affecting a reference time generated using the inaccurate common time signal.

Since voltage waveforms and/or current waveforms of the electric power delivery system are periodic, a clock signal common to the electric power delivery system (e.g., a common time signal) may be used as a reference point by a device determining an electric power delivery system frequency. This common time signal may be received from a remotely managed clock that receives the common time signal from a Global Position Satellite (GPS) satellite or other suitable reference time generating device. A common time signal transmitted from the GPS is communicated to the IEDs, such as via a wireless or wired communicative coupling, and thus the opportunity may exist for time signal manipulation and/or signal jamming before the common time signal would reach a respective IED For example, in some instances, a GPS signal (e.g., clocking signal, timing signal, indication of a time) may be blocked by jamming an area, thus making the GPS signal relatively more difficult to detect and use. In other instances, a false GPS signal may be broadcasted by an external device to the electric power delivery system. A GPS receiver may receive the false GPS signal instead of a true GPS signal (e.g., spoofing operations). The false GPS signal may be at a higher intensity than the true GPS signal. The GPS receiver may lock onto the highest intensity signal. Thus, the GPS receiver may lock on to the false GPS signal more readily than the true GPS signal. The false GPS signal may be manipulated such that the GPS receiver is deceived into generating a false clocking signal and/or calculating a false time, false location, or the like. In this way, a bad actor may manipulate the operation of a system. For example, GPS spoofing may be used to guide a traveling vehicle off-course. Further, it may be possible that GPS spoofing may cause misoperations in a protective system of the electric power delivery system. For example, GPS spoofing may cause an IED to incorrectly determine that an event has occurred, thus causing an incorrect opening of a circuit breaker. Jamming and GPS spoofing are both examples of time signal manipulation.

As described below, protection circuitry of an example electric power delivery system may use common time signals of each IED to detect time signal manipulation. For example, an IED may determine whether a time difference between a first received common time signal (e.g., local) and a second received common time signal (e.g., remote) is non-zero. In some examples, the IED may determine whether the time difference between the first received common time signal and the received common time signal is non-zero and/or greater than (e.g., greater than or equal to) a threshold amount of time. When the time difference is non-zero and/or greater than the threshold amount of time, one of the received common time signals may have been manipulated via a time signal manipulation, or else another misoperation occurred that would cause the time difference. In some examples, additional conditions, such as a signal link quality between the GPS and the IED, may be used to determine a time signal manipulation.

The protective system may improve operation of the electric power delivery system by detecting time signal manipulation before a fault event and/or before the tampering affects an operation of the electric power delivery system. In some cases, the protective system may also perform corrective operations to counteract (e.g., prevent) further system tampering. For example, in response to detecting time signal manipulation, the IED may electrically isolate itself from the manipulated time signal. Furthermore, in some examples, the protective system may also change control operations (e.g., enter a second operational mode) in response to a detected time signal manipulation to reduce an impact of the time signal manipulation on the electric power delivery system. These defensive operations may help to protect an overall integrity of the electric power delivery system.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. In some cases, well-known features, structures or operations are not shown or described in detail. Furthermore, the described features, structures, or operations may be combined in any suitable manner in one or more embodiments. The components of the embodiments as generally described and illustrated in the figures could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular abstract data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

FIG. 1 is a block diagram of an electric power delivery system 18 that may be adapted to use the systems and methods described herein to detect time signal manipulation. The time signal manipulation detection may be based on a remotely managed time used to generate clocking signals or used in various monitoring operations. The electric power delivery system 18 may be any suitable power transmission system, such as a three-phase power delivery system. Although a one-line block diagram is used as a simplified example of the electric power delivery system 18, the systems and methods discussed herein may be used in conjunction with any suitable power delivery system, such as a power transmission system, a power distribution system, radial power distribution systems, bi-directional power systems, or the like.

The electric power delivery system 18 may generate, transmit, and distribute electrical energy to a load 20. The electric power delivery system 18 may include various types of equipment, such as electric generators, power transformers, power transmission and/or delivery lines, circuit breakers, busses, loads (e.g., load 20), and the like. A variety of other types of equipment may also be included in the electric power delivery system 18, such as voltage regulators, capacitor banks, and the like. Furthermore, the system and methods disclosed herein may additionally or alternatively be used with loads as well, such as to determine a frequency of a voltage supplied to the load 20 without considering a frequency of the system as a whole. In the depicted example, the electric power delivery system 18 includes a power line 22 (e.g., a transmission line, distribution bus) that transfers electrical energy from a power generator 24 (e.g., local power generator) to the load 20.

The electric power delivery system 18 may be monitored, controlled, automated, and/or protected using intelligent electronic devices (IEDs) 26 (26A, 26B, 26C, 26D, 26E). As used herein, an IED 26 may refer to any microprocessor-based device that monitors, controls, automates, and/or protects monitored equipment within the electric power delivery system 18. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, or the like. The term "IED" may be used to describe an individual IED or a system that includes multiple IEDs. Some IEDs 26 may include additional circuitry for performing sensing operations or otherwise generating data for use during protection or control operations. For example, a relay (e.g., an IED) may include a phasor measurement unit (PMU) to sense a magnitude and phase of the electric power delivery system 18 referenceable by a control system to change an operation of the electric power delivery system 18.

Each IED 26 may protect one or more components of the electric power delivery system 18. For example, an IED 26A protects the power generator 24. The IED 26A may be in electrical communication with the power generator 24, and may remove the power generator 24 from the electric power delivery system by effecting an open operation of circuit breaker 28 upon detection of certain conditions of the power generator 24.

Some IEDs 26 include computer-readable storage medium and the modules therein implemented as hardware components, such as via discrete electrical components, via a Field Programmable Gate Array (FPGA), and/or via Application Specific Integrated Circuits (ASICs), however some IEDs 26 include processing circuitry used to implement modules stored therein as software-based components. The IEDs 26 may monitor current and/or voltage waveforms associated with a portion of the electric power delivery system 18. The IEDs 26 may monitor a wide range of characteristics associated with monitored equipment, including equipment status, temperature, frequency, pressure, density, infrared absorption, radio-frequency information, partial pressures, viscosity, speed, rotational velocity, mass, switch status, valve status, circuit breaker status, tap status, meter readings, conductor sag, and the like.

In this way, transmission lines 30 and 32 may also be monitored and protected using the IEDs 26. For example, the IEDs 26 may be used to monitor equipment of many types, including electric transmission lines, electric distribution lines, current transformers, busses, switches, circuit breakers, reclosers, transformers 33, autotransformers, tap changers, voltage regulators, capacitor banks, generators, motors, pumps, compressors, valves, and a variety of other types of monitored equipment. Note that, as used herein, the IED 26B may communicate with an additional IED 26C to protect the electric power delivery system 18. For example, a first IED 26, or local IED 26, may be a local relay or an otherwise locally-disposed component or local device. A local relay may refer to a relay that determines a location of a fault as a distance from that relay. Further, a second IED 26, or remote IED 26, may be a remote relay or an otherwise remotely-disposed component or remote device. A remote relay may refer to a relay that transmits data (e.g., current measurements and voltage measurements) used by the local relay in determining the location of the fault.

Each IED 26 may obtain electrical information from a local location of the transmission line 30 using, for example, current transformers (CTs) 34, potential transformers (PTs), or the like. In response to detection of an event, the IEDs 26 may respectively change an operation of a circuit breaker 28 to remove electric power from the transmission line 30. Similarly, one of the IEDs 26 may obtain electrical information from a remote location of the transmission line 30 using, for example, CTs 34, PTs, or the like. Upon detection of an event, the IED 26 may open the circuit breaker 28 to remove electric power from a portion of the electric power delivery system 18. Similarly, IEDs 26 may protect transmission line 32, obtain electric power system information using CTs 34, PTs, and the like, and open or close the circuit breakers 28. It is noted that the circuit breaker 28 may be located at a point of common coupling (PCC), for example, between a local microgrid powered by a generator and a macrogrid that includes a generator.

A common time signal may be distributed throughout the electric power delivery system 18. Utilizing a common or universal time source as the source for the common time signal may enable the IEDs 26 to generate time-synchronized data. In some examples, the IEDs 26 may receive the common time signal from a common time source. The common time signal may be distributed in the electric power delivery system 18 using a communications network or using the common time source, such as a Global Position Satellite (GPS) 36, Global Navigation Satellite System (GLONASS, GNSS), or the like. In this way, the common time signal may be directly received from the common time source, derived from information (e.g., a time, an indication of a time) received from the common time source, and/or based on a signal (e.g., a time, an indication of a time) received from the common time source.

Various power system monitoring and protection operations may benefit from a common time signal. For example, differential protection using IEDs 26 at a local and remote location on the transmission line 32 may improve when each of the IEDs 26 receive a common time signal. To that end, IEDs 26 may obtain a common time signal such as, for example, a time signal provided by the GPS 36. As illustrated, the IEDs 26 receive the common time signal from a clock 38 (e.g., clock receiver, clock receiving device) that receives a common time signal from GPS 36. The GPS 36 may broadcast the common time signal in such a way that the clocks 38 may receive the common time signal and transmit to the IEDs 26 for use in operations. In this way, the IEDs 26 may be time correlated (e.g., time-synchronized) and may share electric power system measurements when performing monitoring and protection operations.

Although the clocks 38 are illustrated as separate from the IEDs 26, the clocks 38 may be part of the IEDs 26. Furthermore, the IEDs 26 may obtain the common time signal directly from the GPS 36 without use of the clocks 38. A single clock 38 may provide a common time signal to multiple IEDs 26. For example, one or more IEDs 26 may be co-located at a local substation, each receiving a common time signal from a single clock 38. Similarly, one or more IEDs 26 may be co-located at a remote substation, each receiving a common time signal from a single clock 38. It is noted that the clocks 38 may broadcast the timing information to the IEDs 26 without being polled.

Although useful, signals from the GPS 36 may be manipulated. A manipulated time signal resulting from a time signal manipulation may cause misoperation in a protective system of the electric power delivery system 18. For example, the manipulated time signal may cause an IED 26 to incorrectly determine that an event has occurred and incorrectly open a circuit breaker 28 in response to the incorrect determination. The electric power delivery system 18 may use at least some of its components as a protective system to help detect time signal manipulation. The protective system may operate using time signals transmitted between IEDs 26 via communication channel 40. These time signals may be transmitted between the IEDs 26 during normal operation and leveraged during detection operations to help detect time signal manipulation.

Figure 2:
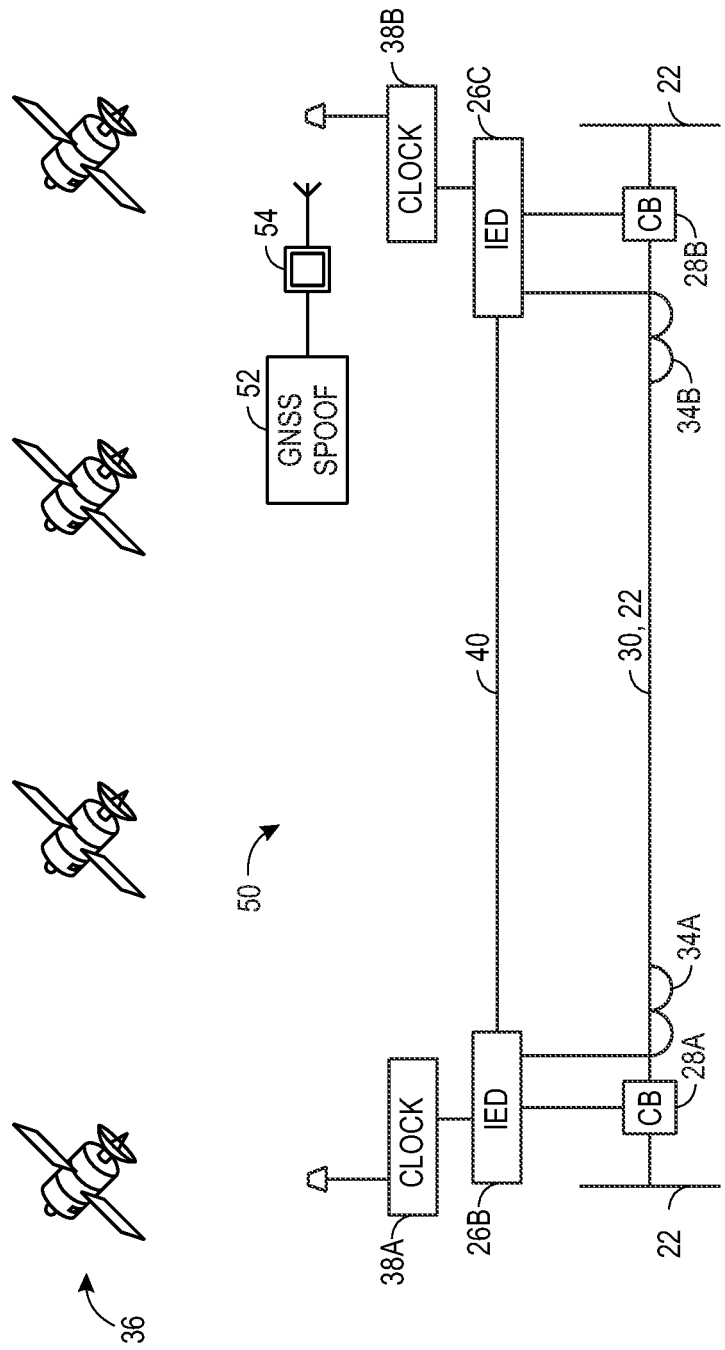
FIG. 2 is a block diagram of an example protective system of the electric power delivery system of FIG. 1, in accordance with an embodiment.

To help explain, FIG. 2 is a block diagram of an example protective system 50 of the electric power delivery system 18. The protective system 50 may include two IEDs 26B, 26C, each receiving a common time signal from respective clocks 38A, 38B. For example, the IED 26B may receive a time signal from the clock 38A just as the IED 26C may receive a time signal from the clock 38B, where local and remote are terms assigned relative to a device-of-interest. In this way, when the IED 26B is considered the local IED (as is generally maintained throughout this disclosure), the IED 26B may receive a local time signal from the clock 38A and may receive a remote time signal from the IED 26C representative of the time signal received by the IED 26C via the clock 38B. However, when IED 26C is considered the local IED, the IED 26C may receive a local time signal from the clock 38B and a remote time signal from the remote IED 26B. Each IED 26B, 26C may use the time signal, as well as voltage and/or current signals measured from transmission line 30, to determine whether to close a respective circuit breaker 28A, 28B. Furthermore, each of the IEDs 26B, 26C may monitor the electrical characteristics of power on the transmission lines 30 (or transmission line 32 from FIG. 1) via internal sensor circuitry to determine whether to close a respective circuit breaker 28A, 28B.

As illustrated, a GPS spoofing device 52 may emulate and transmit a manipulated time signal via radio transmitter 54 to replace a respective time signal (e.g., output from clock 38B) received by the IED 26B or IED 26C and/or to replace a respective time signal received by the clock 38A, 38B. For example, the manipulated time signal may be manipulated in such a way that the electric power system information obtained at IED 26C and coordinated with the manipulated time signal are not obtained at the same common time as electric power system information obtained at IED 26B, which is coordinated with the common time signal from clock 38A. Thus, the IEDs 26 may detect time signal manipulation detection and may modify monitoring operations in response to such detection.

To detect time signal manipulation, the IEDs 26 may include logic circuitry, software, or a combination of hardware and software, to detect undesired time differences. The IEDs 26 may each determine whether a time difference is non-zero and/or whether a time difference is greater than a threshold amount of time. If either of these conditions are met, one or more of the IEDs 26 may determine a time signal manipulation occurred or there is otherwise an issue with one or both of the common time signals. The response to a determined time signal manipulation or to a determined common time signal issue may be similar. That is, one or more of the IEDs 26 may perform a preventive operation, such as isolating one or more portions of the electric power delivery system 18 from the manipulated IED 26 and/or modifying a monitoring operation of the non-manipulated IED 26.

The local IED 26B and the remote IED 26C may use communication circuitry and the communication channel 40 to communicate with each other, with one or more other IEDs 26, and/or with a central monitoring station. Although the central monitoring station is not depicted, in some examples, the central monitoring station may communicate with IEDs 26 via a communication network. The central monitoring station may include a variety of types of systems. For example, the central monitoring station may include a supervisory control and data acquisition (SCADA) system and/or a wide area control and situational awareness (WACSA) system. In some embodiments, a subset of IEDs 26 may communicate with each other via a wired connection (e.g., fiber optic connection) and/or a wireless connection (e.g., Wi-Fi®, Bluetooth®). The communication channel 40 may be a direct communication channel between IEDs 26B, 26C, (e.g., a dedicated protective device communication system, a point-to-point communication system), part of a communication network (e.g., a communication network coupling IEDs 26 to the central monitoring station), a power-line carrier communication system, radio communications, or the like. In some cases, the communication channel 40 is part of a fiber optic network and/or may use fiber-optic communication media. Network communication may be facilitated by networking devices including, but not limited to, multiplexers, access points, routers, hubs, gateways, firewalls, and switches.

In some examples, IEDs 26 and network devices may include physically distinct devices. Sometimes, IEDs 26 and network devices may be composite devices, or may be configured in a variety of ways to perform overlapping functions IEDs 26 and network devices may include multi-function hardware (e.g., processors, computer-readable storage media, communications interfaces, or the like) that may be utilized to perform a variety of tasks that pertain to network communications and/or to equipment operations within the electric power delivery system 18.

The communication channel 40 may facilitate communication between devices according to a communication protocol, such as International Electrotechnical Commission Standard (IEC) 61850, Generic Object Oriented Substation Event (GOOSE), Distributed Network Protocol (DNP3), Schweitzer Engineering Laboratories (SEL) MirroredBits® provided by Schweitzer Engineering Laboratories, Inc. in Pullman, Wash., Modbus, Manufacturing Message Specification (MMS), Sampled Measured Values (SMV), or the like. For protection and monitoring operations, the communication channel 40 may be useful for transmitting and receiving electric power system information between the IEDs 26B, 26C.

Figure 3:
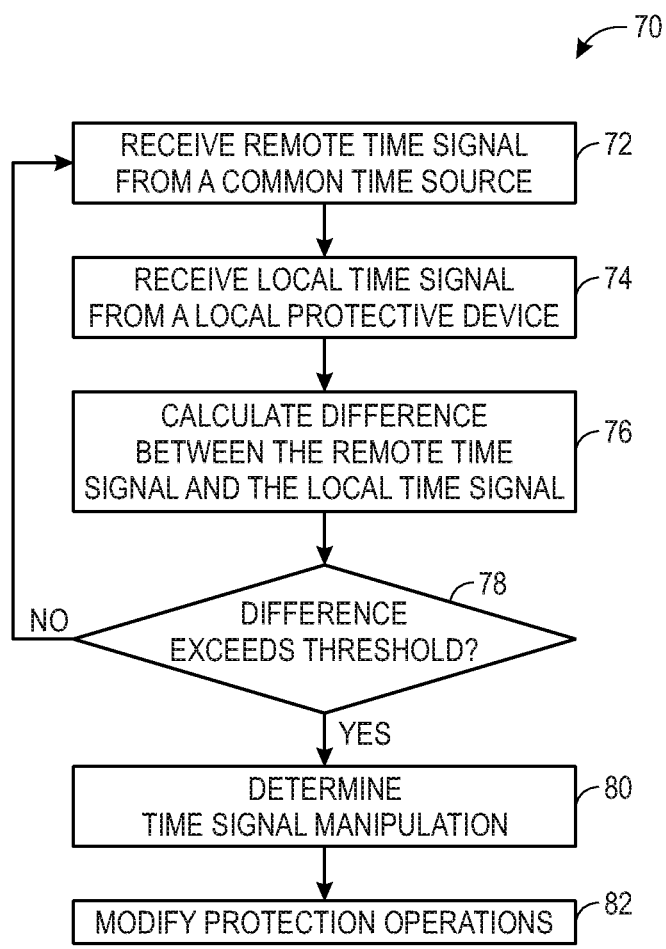
FIG. 3 is a flow chart of a process for operating the protective system of FIG. 2 to detect time signal manipulation, in accordance with an embodiment.

To help explain operation of the protective system 50, FIG. 3 is a flow chart of a process 70 for operating one of the IEDs 26 (e.g., a remote relay, a local relay) to determine whether a time signal was manipulated, or to determine whether time signal manipulation is ongoing. The time signal manipulation may be detected by each of the IED 26B, 26C receiving a local time signal from its associated clock 38A, 38B, receiving a remote time signal from the other of the IED 26B, 26C, and by applying the process 70 to detect time signal manipulation. The process 70 is described below as being performed by the remote IED 26C; however, it should be understood that any suitable processor or processing circuitry may perform the process 70 to detect time signal manipulation (e.g., perform a time signal manipulation detection operation) including the local IED 26B based at least in part on signals from the remote IED 26C and the clock 38A. Furthermore, although depicted in a particular order, it should be understood that any suitable order, and fewer or additional operations, may be performed when performing the process 70.

At block 72, the IED 26C may receive a remote time signal from a common time source. In the example shown in FIG. 2, the IED 26C may receive the remote time signal from the clock 38B. The clock 38B may receive an indication of the time from a common time source, such as the GPS 36, and may transmit a time signal based off the indication of the time to the IED 26C. The IED 26C may locally maintain a time and may use a time signal from the GPS 36 to verify the locally maintained time, or may use the time signal from the clock 38B in place of a locally maintained time.

At block 74, the IED 26C may receive a local time signal from a local protective device. In the example shown in FIG. 2, the IED 26C may receive the local time signal from the IED 26B, that receives an indication of a time from the clock 38A. At block 76, the IED 26C may calculate a time difference between the remote time signal and the local time signal. The IED 26C may use logic circuitry to compare the times. At block 78, the IED 26C may compare the time difference to a threshold amount of time. If the time difference is greater than or equal to a threshold amount of time, the IED 26C may, at block 80, determine that time signal manipulation is ongoing or has occurred. However, if the time difference is not greater than the threshold amount of time, the IED 26C may determine that no time signal manipulation is ongoing or had occurred, and may, at block 72, repeat the process 70 to continue to monitor for time signal manipulation.

At block 82, the IED 26C may modify protection operations in response to determining that there is a time signal manipulation ongoing or that a time signal manipulation occurred. The IED 26C may generate a control signal to cause an alarm to be generated in response to detecting the time signal manipulation. In some examples, the IED 26C may determine to isolate itself and/or the IED 26B from the electric power delivery system 18 in response to detecting the time signal manipulation.

The threshold amount of time, in some examples, may be determined during commissioning of the electric power delivery system 18 and/or during a calibration of the electric power delivery system 18 or the protective system 50. For example, time differences that arise during ordinary operation between the local IED 26B and remote IED 26C may be measured during commissioning and/or calibration when time manipulation is known not to be occurring. The threshold amount of time used at block 78 may be calculated based on the measured time difference. For example, the threshold amount of time may be based at least in part on the measured time difference and an additional acceptable amount of error.

For example, in one example electric power delivery system 18, the measured time difference may be in the range of 40 milliseconds (ms). Protective operations of the IEDs 26 may be accurate with a time difference of 100 ms between the local IED 26B and the remote IED 26C (e.g., an additional acceptable amount of error based on inherent error of the device, time signal accuracy associated with protective operations of the IED 26). Since the measured time difference is in the range of 40 ms, the threshold amount of time may be set to 100 ms. However, if the measured time difference were to exceed the additional acceptable amount of error, the threshold amount of time may be set to equal the measured time difference. Thus, the threshold amount of time may equal a greater of the measured time difference (e.g., a system time delay), additional acceptable amount of error based on inherent error of the local IED 26B (e.g., time signal accuracy of protective operations of a first protective device), or additional acceptable amount of error based on inherent error of the remote IED 26C (e.g., time signal accuracy of protective operations of a second protective device). Setting the threshold amount of time to equal the measured time difference may calibrate detection operations of the process 70 to one or more inherent errors of the system and/or device that may manifest in the measured time difference.

The threshold amount of time may also be calculated based on an expected communication delay between the local IED 26B and the remote IED 26C. The communication delay may be determined based on the media of the communication channel 40 (e.g. the length of the communication channel, the composition of the communication channel, the presence of communication switches, routers, or the like), the communication protocol, and the like. The threshold amount of time may additionally or alternatively be calculated based on processing delays in one or more of the clocks 38, the IEDs 26, the circuit breakers 28, sample rates, sample period, variance in the communication channel 40, error in the time signal, or the like. The threshold amount of time may also take into consideration the acceptable difference between the time signals at the remote and local IEDs 26 for the protective operations of the IEDs 26.

In certain cases, time signals from the clocks 38 may be accompanied with one or more quality indicators. The quality indicators may be applied by the clocks 38 and/or the IEDs 26. For example, a quality indicator may be determined and added to the time signal by the clock 38A or the IED 26B. The quality of the time signal may be determined based on whether the clock 38 is locked to the GPS 36, whether the clock 38 is locked to multiple satellites of the GPS 36, whether a backup time source is being used, or the like. A time quality indicator may be a bit in a communication protocol used to indicate the quality of the time signal transmitted to the IED 26. The time quality indicator may be useful for the IEDs 26 to determine if the time signal may be used in protection operations, or to determine whether operations are to be modified to use to protection operations that do not use a common time signal.

Figure 4:
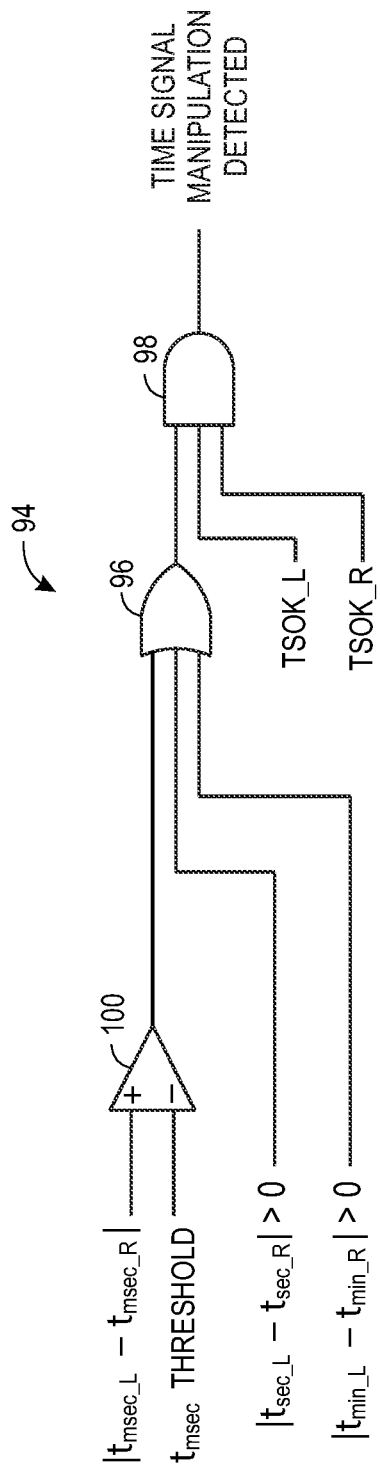
FIG. 4 is a circuit diagram of example detection circuitry of the protective system of FIG. 2, in accordance with an embodiment.

The IED 26C may include detection circuitry to compare the local time signal and the remote time signal. FIG. 4 is a circuit diagram of example logic circuitry 94 that may be used by the IED 26C to detect time signal manipulation. The logic circuitry 94 may be implemented as circuitry (e.g., wires and electrical components) or as instructions running in a processor of an IED 26. In this example, the IED 26C includes logic circuitry 94 to compare the local time signal and the remote time signal. It is noted that although described as within IED 26C, any of the IEDs 26 may include the depicted logic circuitry 94, or other suitable components, to perform at least a portion of the process 70.

In the illustrated embodiment, the time signal communicated between local and remote IEDs 26B, 26C may be divided into minutes, seconds, and milliseconds. A threshold amount of time may be in a range of milliseconds, such that any time difference in the minutes or seconds between the remote time signal and the local time signal may be conclusive that one of the time signals is manipulated. Accordingly, when an absolute value of the time difference between local and remote time signal in seconds (e.g., |tsec_L−tsec_R|) is greater than zero (|tsec_L−tsec_R|>0), a logic high signal output (e.g., "1," voltage output having a voltage level equal to a system logical high voltage value or level) from logic gate 96 (e.g., OR gate) corresponding to a logic high state is transmitted onto logic gate 98 (e.g., AND gate). Similarly, when the absolute value of the time difference between local and remote time signal in minutes (e.g., |tmin_L−tmin_R|) is greater than zero (|tmin_L−tmin_R|>0), the logic high signal output from logic gate 96 is transmitted onto the logic gate 98. It is noted that absolute values of times are positive numbers. Thus, in this example, an equivalent logical statement to greater than zero (e.g., ">0") is non-zero (e.g., "≠0"), since verifying an absolute value of a difference is non-zero also may verify that the difference is greater than zero. It is noted that similar to the logic high signal output, a logic low signal output (e.g., "0," voltage output having a voltage level equal to a system logical low voltage value or level) may be output from components when not transmitting a logic high signal output.

The logic circuitry 94 may also receive an absolute value of the time difference in milliseconds (|tmsec_L−tmsec_R|). A comparator 100 may receive the absolute value of the time difference and compare the absolute value of the time difference against the threshold amount of time (tmsec Threshold). If the magnitude of the time difference is greater than the threshold amount of time, the comparator 100 transmits a logic high signal output to the logic gate 96, which in turn transmits a logic high signal output to logic gate 98.

In the illustrated example, the logic circuitry 94 may determine that a time signal has been manipulated when both the local time signal and the remote time signal are indicated as valid via time quality bits. For example, the time signal may be accompanied with a quality bit indicating the quality of the time signal. When the local time signal quality is acceptable for monitoring operations of the particular IED 26, the local time signal time quality bit (TSOK_L) is present (e.g., logic high signal). Similarly, when the remote time signal quality is acceptable for monitoring operations of the particular IED 26, the remote time signal time quality bit (TSOK_R) is present (e.g., logic high signal). An IED 26 using the logic circuitry 94 to detect a time signal manipulation may thus detect the time signal manipulation when the local time signal quality is acceptable, when the remote time signal quality is acceptable, and when at least one of the three conditions affecting inputs into the logic gate 96 are present. The logic circuitry 94 may indicate the detection of the time signal manipulation via a logic high signal output from the logic gate 98.

When either the remote or local time signal quality is not acceptable, the logic circuitry 94 may set other alarms, may not use the local time signals and/or remote time signals to detect time signal manipulation, or the like, using additional logic circuitry or software to detect the unacceptable remote or local time signal quality. In these cases, quality issues with the local time signal and/or the remote time signal may cause the IED 26 to not detect a time signal manipulation even if present, and thus the IED 26 may not use the local time signals or remote time signals until quality of the time signals improves. Other quality indicators may also be supplied as inputs to the logic gate 98 in addition to or instead of the time quality bits (e.g., TSOK_R, TSOK_L).

It is noted that time signal manipulation may be detected without use of the time quality bits (e.g., TSOK_R, TSOK_L). In these certain embodiments, logic gate 98 may not be used and the time signal manipulation is detected upon determination that the magnitude of the time difference exceeds the threshold amount of time. It is also noted that either or both of the IEDs 26 may independently detect time signal manipulation according to one or more of the embodiments described herein. For example, the local IED 26 may use time quality bits while the remote IED 26C may not use the time quality bits.

Figure 5:
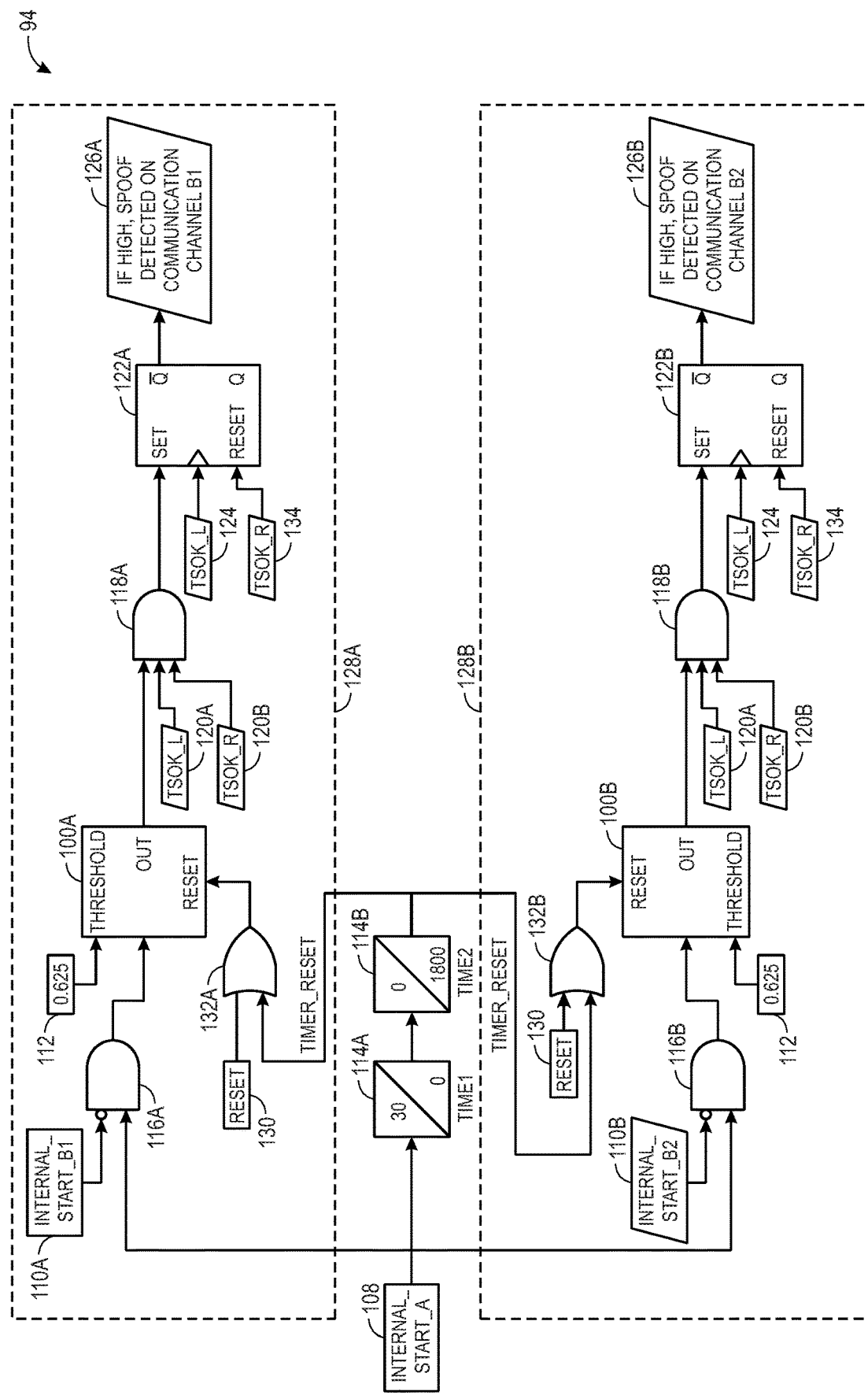
FIG. 5 is a circuit diagram of another example detection circuitry of the protective system of FIG. 2, in accordance with an embodiment.

FIG. 5 is a circuit diagram of another example logic circuitry 94 of the protective system 50. The logic circuitry 94 may receive several times and include several logic gates and flip-flop circuitry to detect whether time signal manipulation has occurred.

The logic circuitry 94 may receive a pulsed signal at a start of a timing interval (e.g., interval_start 108) as part of a monitoring operation from a monitoring IED 26. For ease of discussion, the local IED 26B is described as the monitoring IED 26, however it should be understood that the remote IED 26C may also sometimes be the monitoring IED 26. A signal may be pulsed in each of the IEDs 26B, 26C for a particular duration, such as one second (1 s), to generate the pulsed signal that initiates a time signal manipulation detection operation each timing interval. The pulsed signal from the IED 26B is received as the interval_start_A signal 108 while the pulsed signals from the IED 26C are received as interval_start_B1 signal 110A and interval_start_B2 signal 110B. For example, the timing interval may equal a minute. At a beginning of a minute-length time duration, the logic circuitry 94 may receive an asserted interval_start_A signal 108 indication lasting 1 s. The interval_start_A signal 108 may begin a monitoring period to watch for asserted interval_start_B1 signal 110A and/or asserted interval_start_B2 signal 110B.

If the clocks 38A, 38B are synchronized between the IEDs 26B, 26C, the pulsed signal from the IED 26B (interval_start_A signal 108) is received at a same time as pulsed signals from the IED 26C (interval_start_B1 signal 110A, interval_start_B2 signal 110B) with some allowance for error (e.g., the threshold amount of time). If the pulsed signals from the IEDs 26B, 26C occur at different times minus the error, the IED 26B may determine that there is an error with the GPS 36, the clocks 38, or the IEDs 26, which may indicate a time signal manipulation.

In this particular example, the error is 0.625 cycles (e.g., 10.4 ms) and is provided as an input 112 to comparators 100A, 100B. In response to the pulsed signal from IED 26B (interval_start_A signal 108), one or more conditioning timers 114 may initiate a counting cycle to determine whether the pulsed signals from the IED 26C (e.g., interval_start_B1 signal 110A, interval_start_B2 signal 110B) occur at a different time from the pulsed signal of the IED 26B (e.g., interval_start_A signal 108) minus the error. For example, a conditioning timer 114A may initiate a timing cycle for a first duration of time (time1), such as a thirty cycle pickup lasting about half a second (0.5 s), and a conditioning timer 114B may initiate an additional timing cycle in response to an output from the conditioning timer 114A lasting a second duration of time (time2), such as an 1800 cycle dropout that lasts 30 s. The conditioning timer 114B transmitting a logic high signal output may align with logic gates 116A, 116B transmitting a logic high signal output or a logic low signal output to the comparators 100A, 100B. The logic gates 116A, 116B may output based on whether the logic circuitry 94 has received the pulsed signals from the IED 26C. For example, the logic gate 116A transmits a logic low signal output in response to receiving the interval_start_B1 signal 110A and the interval_start_A signal 108, but transmits a logic high signal output when receiving the interval_start_A signal 108 before receiving the interval_start_B1 signal 110A. If the comparator 100A receives the logic high signal output from the logic gate 116A for longer than the duration of cycles indicated by the input 112, the comparator 100A transmits a logic high signal output to logic gate 118A. The comparator 100A may track a number of cycles (and thus the duration of cycles) using internal counting circuitry.

When the logic gate 118A receives this output from the comparator 100A while also receiving a time quality bit TSOK_L signal 120A and a time quality bit TSOK_R signal 120B, the logic gate 118A transmits a logic high signal output to flip-flop circuitry 122A. The flip-flop circuitry 122A may latch the output from the logic gate 118 in response to a clock pulse 124 and thus signal the detection of the time signal manipulation and/or a difference between the signaling of the IEDs 26B, 26C. Similarly, inputs to the logic gate 116B may affect an output provided as an input to the comparator 100B, that may signal via flip-flop circuitry 122B whether the logic circuitry 94 detected a time signal manipulation and/or a difference between the signaling of the IEDs 26B, 26C. The signaling of the detected time signal manipulation, spoof, and/or difference between clocking of the IEDs 26 is represented via outputs 126B, 126C.

In this example, the logic circuitry 94 includes two similar detection channels 126. A first detection channel 128A may correspond to a first communication channel of the communication channel 40 between the IEDs 26B, 26C. A second detection channel 128B may correspond to a second communication channel of the communication channel 40 between the IEDs 26B, 26C. In some examples, just one channel, the first detection channel 128A, may be included with the logic circuitry 94 to monitor a single communication channel 40 between the IEDs 26B, 26C. However, in some examples, it may be useful to monitor multiple communication channels of the communication channel 40, such as when different channels of the communication channel 40 use different protocols, circuitry, or the like. For example, the first detection channel 128A may correspond to a first communication channel that uses a first protocol, such as generic object oriented substation event (GOOSE) to transmit data between the IEDs 26B, 26C, while the second detection channel 128B may correspond to a second communication channel that uses a second protocol, such as IEC 61850, DNP3, SEL MirroredBits®, Modbus, or some other protocol, to transmit data between the IEDs 26B, 26C. In this way, the logic circuitry 94 may include any number of detection channels 128 to perform additional monitoring operations.

Furthermore, in this example, the time quality bits 120A, 120B were used to control when to generate the outputs 126B, 126C. In some examples, however, the time quality bits 120A, 120B are not used. Thus, in some cases, outputs from the comparators 100A, 100B transmit directly to respectively coupled flip-flop circuitry to generate the outputs 126B, 126C.

The IED 26B may reset the logic circuitry 94. The conditioning timer 114B may periodically reset sequencing timer input (timer_reset) to enable monitoring intervals of the comparators 100A, 100B to be reset. The comparators 100A, 100B may track a number of cycles (and thus the duration of cycles) using internal counting circuitry. When the conditioning timer 114B is reset, the internal counting circuitry of the comparators 100A, 100B may also be reset. In some examples, the internal counting circuitry may immediately begin a subsequent count after being reset, and thus a next monitoring interval may immediately begin. Another option for resetting the logic circuitry 94 may be to toggle a reset signal 130 to logic gates 132A, 132B. The flip-flop circuitry 122A, 122B may also be reset via a reset signal 134, which may or may not be the same as the reset signal 130.

The IEDs 26 may take several actions upon detection of a manipulated time signal (e.g., in response to the outputs 126B, 126C). For example, the IEDs 26 may provide an alarm signal in response to the output 126B and/or the output 126C. The alarm signal may include visible alarms, audible alarms, indications on Supervisory Control and Data Acquisition (SCADA) system, communication of the alarm to an operator via another communications channel, or the like. In some cases, the IEDs 26 may modify protection operations in response to the output 126B and/or the output 126C, for example, blocking open commands that result from protection operations based at least in part on accurate time signals. Furthermore, in some examples, the IEDs 26 may modify protection operations by switching to protection operations that do not rely on accurate time signals from both local and remote IEDs 26. In some cases, the IEDs 26 may modify protection operations by signaling clocks, communication switches, or the like to also detect time signal manipulation and determine which time signal is manipulated. In some cases, the IEDs 26 may enter a higher security mode or lockout mode that requests an operator input valid credentials before a respective IED 26 may be accessed, controlled, and/or modified in response to the output 126B and/or the output 126C. Furthermore, the IEDs 26 may request an operator input valid credentials before performing operations that are remotely commanded in response to the output 126B and/or the output 126C.

Figure 6:
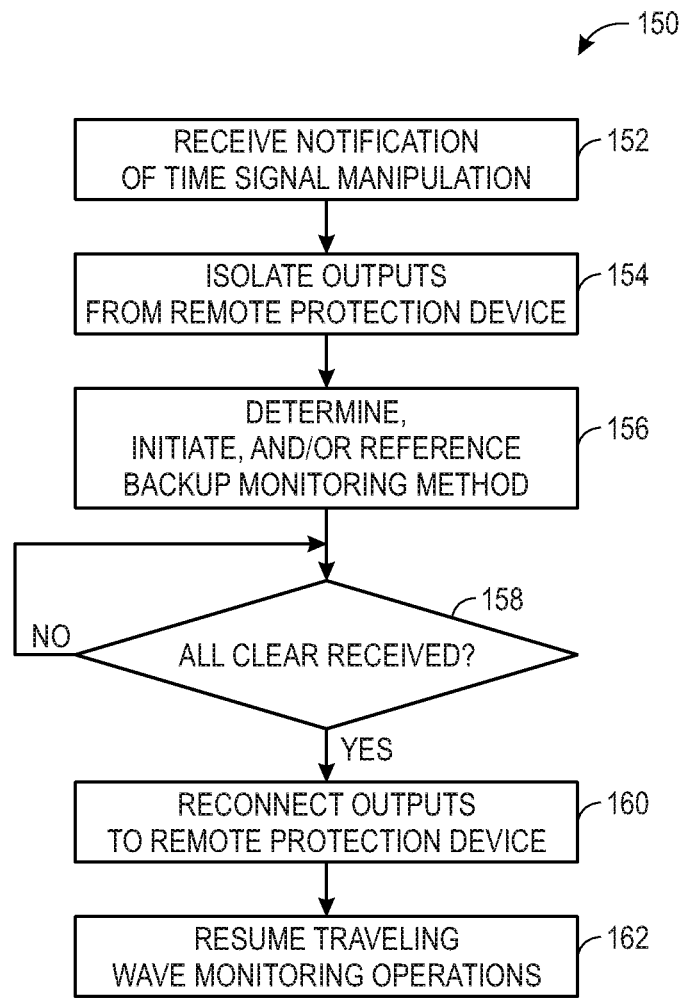
FIG. 6 is a flow chart of a process for operating the electric power delivery system of FIG. 1 in response to a detected time signal manipulation, in accordance with an embodiment.

To highlight a particular response example, FIG. 6 is a flow diagram of a process 150 for operating the local IED 26B in response to the output 126B and/or the output 126C indicating a detected time signal manipulation. The time signal manipulation may be detected by each IED 26B, 26C receiving a local time signal from its associated clock 38A, 38B, receiving a remote time signal from the other IED 26B, 26C, and by applying the process 150 to the output 126B and/or the output 126C indicating a detected time signal manipulation. The process 150 is described below as being performed by the local IED 26B; however, it should be understood that any suitable processor or processing circuitry may perform the process 150 including the remote IED 26C. Furthermore, although depicted in a particular order, it should be understood that any suitable order, and fewer or additional operations, may be performed when performing the process 150.

Thus, at block 152, the local IED 26B may receive notification of time signal manipulation. The local IED 26B may receive the notification via the output 126B and/or the output 126C indicating a detected time signal manipulation. Furthermore, in some cases, the notification of time signal manipulation may be a calculation result or output from a software application running via processing circuitry of the local IED 26B.

In response to receiving the notification, at block 154, the local IED 26B may isolate its inputs from the remote IED 26C affected by the detected time signal manipulation. In some cases, the local IED 26B may isolate itself totally from inputs to protect against additional time signal manipulation operations and/or otherwise nefarious inputs. The local IED 26B may transmit a control signal to the remote IED 26C to instruct the remote IED 26C to turn off communication with the communication channel 40.

At block 156, the local IED 26B may determine, initiate, and/or reference a backup monitoring operation. For example, the local IED 26B may normally perform traveling wave monitoring operations. The traveling wave monitoring operations may use a data signal from the remote IED 26C to improve a determination of fault locations within the electric power delivery system 18. However, when data from the remote IED 26C is compromised via time signal manipulation, the local IED 26B monitoring operations may reduce in accuracy. Thus, the local IED 26B may isolate itself from the remote IED 26C and determine to use a backup monitoring operation. In this way, the local IED 26B is prevented from using electrical power system information from the remote IED 26C in protection operations performed by the local IED 26B. The backup monitoring operation may not use signals from the remote IED 26C and thus may enable the local IED 26B to provide suitable monitoring while isolated from the remote IED 26C. The local IED 26B may continue to use the backup monitoring operation until receiving an "all clear" notification.

At block 158, the local IED 26B continues to check for the "all clear" notification. Once the "all clear" notification is received, the local IED 26B, at block 160, may reconnect outputs to the remote IED 26C. The "all clear" notification may be provided from an operator or a central control system performing correction operations to account for and fix the time signal manipulation. The "all clear" notification may indicate to the local IED 26B that data from the remote IED 26C is valid and unaffected once again. Thus, the local IED 26B may recouple its inputs to the outputs of the remote IED 26C. At block 162, the local IED 26B may resume use of traveling wave monitoring operations. In response to continuing the use of traveling wave monitoring operations, the local IED 26B may stop using the backup monitoring operation.

At each operation of the process 150, the local IED 26B and/or the remote IED 26C may generate data to be displayed via a human machine interface to communicate a status of operation of each IED 26 with an operator. Furthermore, the IEDs 26 may generate notifications that communicate which monitoring method (e.g., traveling wave monitoring operations or backup monitoring operations) that IED 26 is currently using to protect the electric power delivery system 18.

In some examples, the IEDs 26 may request validation of the time signal manipulation detection from other devices capable of detecting time signal manipulation. For example, the IED 26 may request from the clocks 38 and/or communication switching devices whether such devices have also detected time signal manipulation.

It should be understood that examples discussed herein may be resident in firmware or software running on the IEDs 26. It is noted that although circuitry of FIG. 4 and FIG. 5, and descriptions included herein, are described as logical components, in some cases, these logic operations may be represented and performed via software operations. For example, a software application or portion of code may be used by the IED 26C to AND two or more input signals. In this way, the IEDs 26 may store the software application written to execute pseudocode to implement time signal manipulation detection operations. For example, the IEDs 26 may store software applications developed using user logic.

Furthermore, some depictions of logic circuitry have been described via this disclosure. It should be understood that logically-equivalent circuitry may be used herein to implement the systems and methods described. For example, a logical XOR gate may be replaced via a logically-equivalent combination of NOT gates, AND gates, Inverse NOT gates, OR gates, NAND gates, NOR gates, or the like.

Thus, technical effects of the present disclosure include systems and methods for determining when common time signals received by two or more IEDs are synchronous. The systems and methods may use a time from a remote IED and a time from a local IED to determine that the common time signals are synchronous. In this way, the systems and methods may enable the local IED to determine when information gathered via the remote IED is accurate, and thus may be used to determine control operations. An IED may include logic circuitry that determines when signals from the local IED and the remote IED are not synchronous, and thus when the signals may be manipulated via a time signal manipulation. A first example of the logic circuitry may compare differences in times between the local IED and the remote IED to detect time signal manipulation. A second example of the logic circuitry may compare differences in signal arrival time between the local IED and the remote IED to determine whether a remotely maintained time is synchronous with a locally maintained time to detect time signal manipulation. These improved methods may improve power transmission system operation by enabling control and/or protection circuitry to detect time signal manipulation. This may improve a response of the power transmission system to a fault condition, or other abnormal operation by increasing resiliency of the electric power delivery system to undesired manipulation.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A protective system for detecting and mitigating against manipulated time signals in an electric power delivery system, the protective system comprising:
   a first protective device disposed at a local location of the electric power delivery system, wherein the first protective device is configured to:
      provide a first protective operation at the local location;
      receive a local time signal generated based at least in part on a common time source; and
      transmit the local time signal via a communication system; and
   a second protective device in communication with a remote location of the electric power delivery system, wherein the second protective device is configured to:
      provide a second protective operation at the remote location;
      receive a remote time signal generated based at least in part on the common time source;
      receive the local time signal from the first protective device via the communication system;
      calculate a time difference between the remote time signal and the local time signal, wherein the time difference is at least partly due to latencies in communication between the first protective device and second protective device;
      compare the time difference with a threshold; and
      when the time difference exceeds the threshold,
         detect a time signal manipulation that indicates that the local time signal or the remote time signal, or both, are inaccurate; and
         upon detection of the time signal manipulation, modify the second protective operation to avoid use of electrical power system information from the first protective device.

2. The protective system of claim 1, wherein the second protective device communicates the detection of the time signal manipulation to the first protective device via the communication system.

3. The protective system of claim 1, wherein the common time source comprises Global Position Satellite (GPS) satellites configured to:
   communicate with the common time source;
   provide the local time signal to a first clock receiver coupled to the first protective device; and
   provide the remote time signal to a second clock receiver coupled to the second protective device.

4. The protective system of claim 3, wherein the local time signal comprises a GPS time signal.

5. The protective system of claim 1, wherein the communication system comprises a dedicated protective device communication system.

6. The protective system of claim 5, wherein the communication system comprises a point-to-point communication system between the first and second protective devices.

7. The protective system of claim 1, wherein the second protective device is configured to generate an alarm in response to detecting the time signal manipulation.

8. The protective system of claim 1, wherein the threshold is less than a time signal accuracy associated with the first protective operation or the second protective operation.

9. The protective system of claim 1 wherein the threshold comprises a signal delay of the communication system and a processing delay of the first and second protective devices.

10. A tangible, non-transitory, computer-readable medium comprising instructions that, when executed by a processor, cause the processor to:
   receive a first time signal, wherein the first time signal is derived from a common time source;
   receive a second time signal from a local intelligent electronic device (IED) via a communication system, wherein the second time signal is derived from the common time source;
   calculate a time difference between the first time signal and the second time signal;
   compare the time difference with a threshold amount of time;
   determine the threshold amount of time to be the greater of one of the following:
      a system time delay;
      a first time signal accuracy associated with a protective operation of the local intelligent electronic device; and a second time signal accuracy associated with a protective operation of a remote intelligent electronic device coupled remotely relative to the local intelligent electronic device; and when the time difference exceeds the threshold amount of time, detect a time signal manipulation.

11. The computer-readable medium of claim 10, comprising instructions that cause the processor to:

perform a calibration operation to determine the system time delay.

12. The computer-readable medium of claim 10, comprising instructions that cause the processor to:

stop, in response to determining the time signal manipulation, communication with the local intelligent electronic device (IED) via the communication system; and adjust a monitoring operation to use a monitoring method that does not rely on data originated from the local intelligent electronic device (IED).

13. A device, comprising:

a comparator configured to compare a first time signal and a second time signal to a threshold amount of time; and a first logic gate coupled to the comparator, wherein the comparator outputs a first voltage signal corresponding to a first logic state voltage level to the logic gate in response to a time difference between a transmission of the first time signal and a transmission of the second time signal being greater than the threshold amount of time, and wherein the logic gate generates a control signal to indicate a time signal manipulation in response to the first voltage signal from the comparator.

14. The device of claim 13, comprising:

a second logic gate coupled to the first logic gate, wherein the second logic gate is configured to selectively transmit the control signal in response to receiving a time quality bit indicative of a quality of the first time signal.

15. The device of claim 14, wherein the first time signal corresponds to a remote time signal transmitted from a common time source to a remotely disposed relay, and wherein the second time signal corresponds to a local time signal transmitted from the common time source to a locally disposed relay.

16. The device of claim 13, comprising:

a monitoring logic gate that:

receives a first pulse from a remotely disposed component;

receives a second pulse from a locally disposed component; and outputs a second voltage signal corresponding to the first logic state voltage level for a duration of time corresponding equal to an amount of time that the monitoring logic gate received the second pulse before the first pulse.

17. The device of claim 16, wherein the comparator is configured to receive the second voltage signal from the monitoring logic gate, and wherein the comparator compares the duration of time to the threshold amount of time when determining to generate the first voltage signal.

18. The device of claim 17, comprising:

reset circuitry that resets counting circuitry internal to the comparator in response to a time interval ending, wherein the first voltage signal is reset to a second logic state voltage level in response to a resetting of the counting circuitry.

* * * * *